US012632577B2

(12) United States Patent
Chen et al.

(10) Patent No.: US 12,632,577 B2
(45) Date of Patent: May 19, 2026

(54) PERMISSION CONTROL METHOD AND DEVICE AND ELECTRONIC EQUIPMENT

(71) Applicant: BEIJING ZITIAO NETWORK TECHNOLOGY CO., LTD., Beijing (CN)

(72) Inventors: Wei Chen, Shenzhen (CN); Xuejia Chen, Shenzhen (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/877,692

(22) Filed: Jul. 29, 2022

(65) Prior Publication Data

US 2022/0374538 A1 Nov. 24, 2022

Related U.S. Application Data

(63) Continuation of application No. PCT/CN2021/119688, filed on Sep. 22, 2021.

(30) Foreign Application Priority Data

Oct. 10, 2020 (CN) .......................... 202011081251.9

(51) Int. Cl.
| | |
|---|---|
| G06F 21/62 | (2013.01) |
| G06F 16/955 | (2019.01) |
| G06F 21/55 | (2013.01) |

(52) U.S. Cl.
CPC ...... G06F 21/6218 (2013.01); G06F 16/9558 (2019.01); G06F 21/554 (2013.01); G06F 2221/031 (2013.01)

(58) Field of Classification Search
CPC .............. G06F 21/6218; G06F 21/554; G06F 16/9558; G06F 2221/031

(Continued)

(56) References Cited

U.S. PATENT DOCUMENTS

| | | | |
|---|---|---|---|
| 7,457,951 B1* | 11/2008 | Proudler | G06F 21/566 |
| | | | 726/26 |
| 8,805,742 B2* | 8/2014 | Kim | H04L 69/329 |
| | | | 709/229 |

(Continued)

FOREIGN PATENT DOCUMENTS

| | | |
|---|---|---|
| CN | 1842029 A | 10/2006 |
| CN | 102333076 A | 1/2012 |

(Continued)

OTHER PUBLICATIONS

Cseke. "SoulMind: Interactive Platform for Domain-Specific Data Analysis and Visualization." In 2020 IEEE 18th International Symposium on Intelligent Systems and Informatics (SISY), pp. 77-82. IEEE, 2020. (Year: 2020).*

(Continued)

*Primary Examiner* — Luu T Pham
*Assistant Examiner* — Walter J Malinowski

(57) ABSTRACT

A right control method, a right control apparatus and an electronic device are provided according to embodiments of the present disclosure. when at least one reader of the document has the first user right on the target subdocument, the first prompt information may be displayed to remind a user who is currently browsing the document, that at least one reader of the document does not yet have access to the target subdocument. At this time, the user may determine the target reader among the at least one reader of the document by triggering the first prompt information, and authorize the target reader to have the second right on the target subdocument, so that the target reader among the at least one reader has access to the target subdocument.

16 Claims, 12 Drawing Sheets

(58) Field of Classification Search
USPC ......................................................... 726/26
See application file for complete search history.

(56) References Cited

U.S. PATENT DOCUMENTS

| | | | | |
|---|---|---|---|---|
| 9,552,334 | B1 * | 1/2017 | Meisels .................. | G06Q 50/01 |
| 10,148,701 | B1 * | 12/2018 | Hecht ..................... | G06F 9/455 |
| 10,305,683 | B1 * | 5/2019 | Ghafourifar .......... | H04L 9/0816 |
| 11,201,981 | B1 * | 12/2021 | Suiter ................. | G06F 3/04817 |
| 2001/0018704 | A1 * | 8/2001 | Kikugawa ............. | G06F 16/957 |
| | | | | 707/E17.119 |
| 2003/0028495 | A1 * | 2/2003 | Pallante ............... | G06Q 20/341 |
| | | | | 705/78 |
| 2003/0115176 | A1 * | 6/2003 | Bobroff ................ | G06F 16/288 |
| 2004/0148288 | A1 * | 7/2004 | Haeberle ............... | G06Q 10/06 |
| 2004/0225513 | A1 * | 11/2004 | Haeberle .............. | G06Q 50/163 |
| | | | | 705/314 |
| 2005/0108556 | A1 * | 5/2005 | DeMello ................. | G06F 21/10 |
| | | | | 713/189 |
| 2005/0222861 | A1 * | 10/2005 | Silverman ............. | G06Q 50/16 |
| | | | | 705/307 |
| 2005/0251684 | A1 * | 11/2005 | Mitsuoka ........... | H04L 67/1097 |
| | | | | 713/182 |
| 2006/0156031 | A1 * | 7/2006 | Sturms ............... | G06F 21/6218 |
| | | | | 713/189 |
| 2007/0027706 | A1 * | 2/2007 | Murray ................. | G06Q 10/10 |
| | | | | 705/7.11 |
| 2007/0027917 | A1 * | 2/2007 | Ariel .................... | G06Q 10/109 |
| 2007/0094333 | A1 * | 4/2007 | Schilling ............. | H04N 21/435 |
| | | | | 709/206 |
| 2007/0100767 | A1 * | 5/2007 | Kim ........................ | H04L 63/10 |
| | | | | 705/59 |
| 2007/0255698 | A1 * | 11/2007 | Kaminaga .......... | G06F 16/3331 |
| | | | | 707/E17.069 |
| 2008/0005729 | A1 * | 1/2008 | Harvey .................... | G06F 8/61 |
| | | | | 717/155 |
| 2008/0098039 | A1 * | 4/2008 | Kruis .................. | G06F 16/9562 |
| 2008/0133404 | A1 * | 6/2008 | Bascom ............... | G06F 16/289 |
| | | | | 707/999.103 |
| 2008/0165005 | A1 * | 7/2008 | Burbridge .......... | G06K 7/10049 |
| | | | | 340/572.1 |
| 2008/0244020 | A1 * | 10/2008 | Dolan .................... | G06Q 10/10 |
| | | | | 709/204 |
| 2010/0230486 | A1 * | 9/2010 | Smith ................... | G07F 19/211 |
| | | | | 235/379 |
| 2010/0312385 | A1 * | 12/2010 | Deuber ................. | G06Q 30/06 |
| | | | | 177/1 |
| 2011/0178837 | A1 * | 7/2011 | Goerges ................ | G06Q 10/06 |
| | | | | 705/1.1 |
| 2011/0296507 | A1 * | 12/2011 | Khosrowshahi ...... | G06F 40/134 |
| | | | | 715/810 |
| 2012/0137360 | A1 * | 5/2012 | Henderson ........... | H04L 63/102 |
| | | | | 726/17 |
| 2012/0242603 | A1 * | 9/2012 | Engelhardt ............ | G06F 21/32 |
| | | | | 345/173 |
| 2012/0290109 | A1 * | 11/2012 | Engelberg .............. | G16H 20/30 |
| | | | | 700/91 |
| 2013/0054636 | A1 * | 2/2013 | Tang ..................... | G06F 40/169 |
| | | | | 707/769 |
| 2013/0080471 | A1 * | 3/2013 | Forte ................... | G06F 21/6218 |
| | | | | 707/785 |
| 2013/0218829 | A1 * | 8/2013 | Martinez ................ | G06Q 10/10 |
| | | | | 707/608 |
| 2013/0232506 | A1 * | 9/2013 | Mazzoni ................. | G06F 9/542 |
| | | | | 719/313 |
| 2013/0254284 | A1 * | 9/2013 | Dougherty ............. | G06F 21/00 |
| | | | | 709/204 |
| 2013/0262420 | A1 * | 10/2013 | Edelstein .............. | G06F 40/197 |
| | | | | 707/695 |
| 2014/0089104 | A1 * | 3/2014 | Nanba ................. | G06Q 30/0251 |
| | | | | 705/14.66 |

| | | | | |
|---|---|---|---|---|
| 2014/0095327 | A1 * | 4/2014 | Muthugopalakrishnan ................. | |
| | | | | G06Q 30/0277 |
| | | | | 705/14.73 |
| 2014/0101233 | A1 * | 4/2014 | Mina ..................... | G06F 16/972 |
| | | | | 709/203 |
| 2014/0230078 | A1 * | 8/2014 | Graham ................. | G06F 21/60 |
| | | | | 726/30 |
| 2014/0263677 | A1 * | 9/2014 | Divringi ................ | G06K 1/121 |
| | | | | 235/494 |
| 2015/0149266 | A1 * | 5/2015 | Inuzuka ................. | G06Q 30/02 |
| | | | | 705/14.14 |
| 2015/0172403 | A1 * | 6/2015 | Steinbok ............... | G06Q 50/01 |
| | | | | 709/205 |
| 2015/0242621 | A1 * | 8/2015 | Jackson ............. | G06F 21/6281 |
| | | | | 726/17 |
| 2015/0272575 | A1 * | 10/2015 | Leimbach .............. | A61B 90/96 |
| | | | | 227/175.3 |
| 2015/0286622 | A1 * | 10/2015 | Majumdar ............ | G06Q 10/00 |
| | | | | 715/230 |
| 2015/0378560 | A1 * | 12/2015 | Wu ......................... | G06F 21/10 |
| | | | | 715/764 |
| 2016/0110541 | A1 * | 4/2016 | Kulkarni ................ | G06F 21/53 |
| | | | | 726/22 |
| 2016/0254946 | A1 * | 9/2016 | Prevost ................. | H04W 12/06 |
| | | | | 455/420 |
| 2016/0294729 | A1 * | 10/2016 | Musoll .................. | H04L 49/103 |
| 2016/0364565 | A1 * | 12/2016 | Studený ................. | G06F 21/44 |
| 2017/0047998 | A1 * | 2/2017 | Palanisamy ......... | H04W 88/085 |
| 2017/0155653 | A1 * | 6/2017 | Guo ...................... | H04L 63/105 |
| 2017/0214695 | A1 * | 7/2017 | Chachar ................. | H04L 63/10 |
| 2017/0353466 | A1 | 12/2017 | Weaver et al. | |
| 2017/0357822 | A1 * | 12/2017 | Wei ........................... | H04L 9/30 |
| 2019/0005251 | A1 * | 1/2019 | Hamlin .................. | G06F 16/93 |
| 2019/0012400 | A1 * | 1/2019 | Kobayashi ............. | G06F 9/451 |
| 2019/0028462 | A1 * | 1/2019 | Ishikawa ............... | H04L 63/102 |
| 2019/0155802 | A1 * | 5/2019 | Miller ................... | G06Q 10/00 |
| 2019/0155920 | A1 * | 5/2019 | Araki ...................... | H04L 51/18 |
| 2019/0251132 | A1 * | 8/2019 | Jezewski ................. | H04L 67/34 |
| 2019/0325673 | A1 * | 10/2019 | Bardack ................... | G07C 9/27 |
| 2020/0162252 | A1 * | 5/2020 | Davis ................... | H04L 9/0872 |
| 2020/0302086 | A1 * | 9/2020 | Post ...................... | H04L 9/3213 |
| 2021/0141997 | A1 * | 5/2021 | Pinnamaneni ........ | G06F 3/0483 |
| 2021/0342541 | A1 * | 11/2021 | Taylor ............... | G06F 16/3328 |
| 2022/0278853 | A1 * | 9/2022 | Ben-Reuven ......... | H04L 63/123 |
| 2022/0319219 | A1 * | 10/2022 | Tsibulevskiy ............ | G06T 3/60 |

FOREIGN PATENT DOCUMENTS

| | | | | | |
|---|---|---|---|---|---|
| CN | 103347091 | A | * | 10/2013 | |
| CN | 105337838 | A | * | 2/2016 | |
| CN | 109219824 | A | | 1/2017 | |
| CN | 110348236 | A | | 10/2019 | |
| CN | 111581924 | A | | 8/2020 | |
| CN | 112257104 | A | * | 1/2021 | ........ G06F 16/9558 |
| EP | 0426593 | A2 | * | 5/1991 | |
| JP | 2003330398 | A | * | 11/2003 | |
| JP | 4035799 | B2 | * | 1/2008 | ............ H04L 41/12 |
| JP | 2012073936 | A | * | 4/2012 | |
| JP | 5089202 | B2 | * | 12/2012 | |
| JP | 2013037432 | A | * | 2/2013 | |
| JP | 2013189312 | A | * | 9/2013 | |
| JP | 2017045106 | A | * | 3/2017 | |
| WO | WO-0163528 | A1 | * | 8/2001 | ........ G06F 17/30011 |
| WO | WO-2010105246 | A2 | * | 9/2010 | .......... G06F 16/332 |
| WO | WO-2019054044 | A1 | * | 3/2019 | .............. H04L 9/50 |
| WO | WO-2022073418 | A1 | * | 4/2022 | ........ G06F 16/9558 |

OTHER PUBLICATIONS

Ševcech, Jakub, and Maria Bielikova. "User's Interest Detection through Eye Tracking for Related Documents Retrieval." In 2014 9th International Workshop on Semantic and Social Media Adaptation and Personalization, pp. 9-13. IEEE, 2014. (Year: 2014).*
Klein, Johannes, Jean Botev, and Steffen Rothkugel. "Enabling Near Real-Time Collaboration in a Distributed Multimedia Editing Environment." In 2017 IEEE International Symposium on Multi-

(56) References Cited

OTHER PUBLICATIONS media (ISM), pp. 587-594. IEEE, 2017. (Year: 2017).*

Anderson, Kenneth M., Susanne A. Sherba, and William V. Lepthien. "Towards large-scale information integration." In Proceedings of the 24th international conference on Software engineering, pp. 524-534. 2002. (Year: 2002).*

Steimle, Jürgen, Oliver Brdiczka, and Max Mühlhäuser. "Cross-media linking and tagging support for learning groups." In 2008 Tenth IEEE International Symposium on Multimedia, pp. 714-719. IEEE, 2008. (Year: 2008).*

Gladney, H. M. "Administrative control of computing service." IBM Systems Journal 17, No. 2 (1978): 151-178. (Year: 1978).*

Su, Mang, Fenghua Li, Zhi Tang, Yinyan Yu, and Bo Zhou. "An Action-Based Fine-Grained Access Control Mechanism for Structured Documents and Its Application." The Scientific World Journal 2014, No. 1 (2014): 232708. (Year: 2014).*

Furuta, Richard, Jaime Navon, and P. David Stotts. "Subdocument invocation semantics in collaborative hyperdocuments." In Proceedings 4th IEEE Workshop on Enabling Technologies: Infrastructure for Collaborative Enterprises (WET ICE'95), pp. 138-146. IEEE, 1995. (Year: 1995).*

Shang, Ning, Mohamed Nabeel, Federica Paci, and Elisa Bertino. "A privacy-preserving approach to policy-based content dissemination." In 2010 IEEE 26th International Conference on Data Engineering (ICDE 2010), pp. 944-955. IEEE, 2010. (Year: 2010).*

Saltzer, Jerome H., and Michael D. Schroeder. "The protection of information in computer systems." Proceedings of the IEEE 63, No. 9 (1975): 1278-1308. (Year: 1975).*

International Search Report and Written Opinion for International Application No. PCT/CN2021/119688, mailed Dec. 7, 2021, 14 Pages.

* cited by examiner

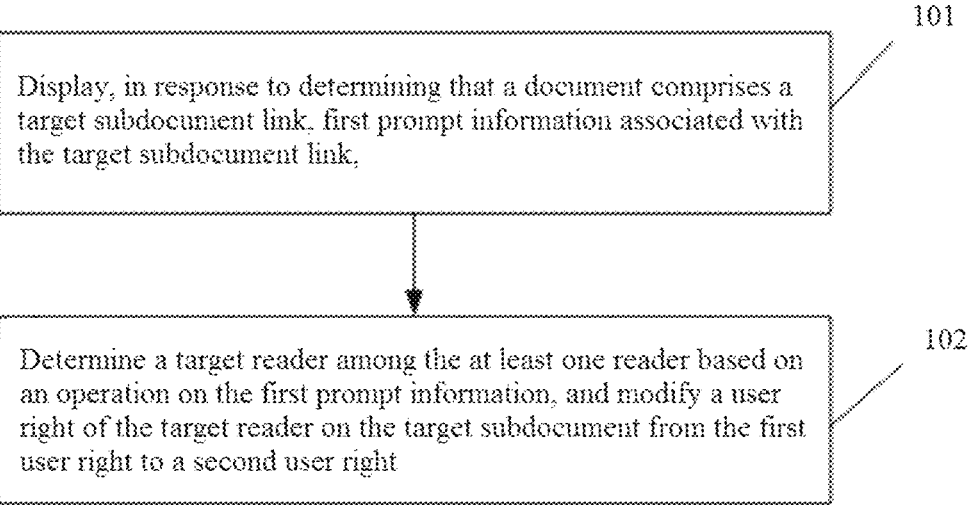

101

Display, in response to determining that a document comprises a target subdocument link, first prompt information associated with the target subdocument link.

102

Determine a target reader among the at least one reader based on an operation on the first prompt information, and modify a user right of the target reader on the target subdocument from the first user right to a second user right

Figure 1

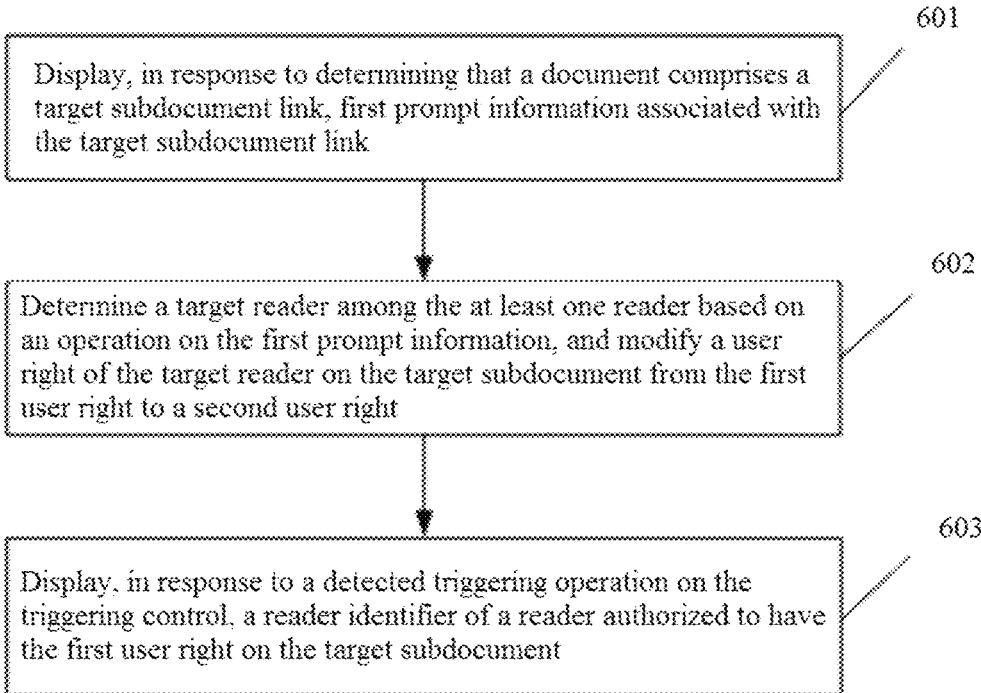

Display, in response to determining that a document comprises a target subdocument link, first prompt information associated with the target subdocument link                                                    601

Determine a target reader among the at least one reader based on an operation on the first prompt information, and modify a user right of the target reader on the target subdocument from the first user right to a second user right                                                    602

Display, in response to a detected triggering operation on the triggering control, a reader identifier of a reader authorized to have the first user right on the target subdocument                                                    603

PERMISSION CONTROL METHOD AND DEVICE AND ELECTRONIC EQUIPMENT

REFERENCE TO RELATED APPLICATION

This application is a continuation of International Patent Application No. PCT/CN2021/119688, titled "RIGHT CONTROL METHOD AND APPARATUS, AND ELECTRONIC DEVICE", filed on Sep. 22, 2021, which claims priority to Chinese Patent Application No. 202011081251.9, titled "RIGHT CONTROL METHOD AND APPARATUS, AND ELECTRONIC DEVICE", filed on Oct. 10, 2020, both of which are incorporated herein by reference in their entireties.

FIELD

The present disclosure relates to the technical field of internet, and in particular to a right control method, a right control apparatus and an electronic device.

BACKGROUND

With the development of science and technology, online documents may be used in official work. The online documents can be read and edited by multiple users at the same time. After publishing an online document, the publisher of the online document can authorize some users to have the right to edit the online document, and authorize some other users to have only the right to read the online document. Users who have right to edit the online document may add some content into the online document when reading the online document. For example, some explanatory content may be added. If the explanatory content is directly added into the online document, the online documentation may not be well displayed. Therefore, a link to the explanatory content may be added into the online document, and a user may click the link to read the explanatory content.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

A right control method, a right control apparatus and an electronic device are provided according to embodiments of the present disclosure, to distinguish non-shared subdocument links distinguished from the shared subdocument links, so that assistant a user to share the non-shared subdocument links.

In a first aspect, a right control method is provided according to embodiments of the present disclosure. The method includes: displaying, in response to determining that a document includes a target subdocument link, first prompt information associated with the target subdocument link, where at least one reader is authorized to have a first user right on a target subdocument indicated by the target subdocument link; and determining a target reader among the at least one reader based on an operation on the first prompt information, and modifying a user right of the target reader on the target subdocument from the first user right to a second user right.

In a second aspect, a right control apparatus is provided according to embodiments of the present disclosure. The apparatus includes: a displaying unit, configured to display, in response to determining that a document includes a target subdocument link, first prompt information associated with the target subdocument link, where at least one reader is authorized to have a first user right on a target subdocument indicated by the target subdocument link; and a modifying unit, configured to determine a target reader among the at least one reader based on an operation on the first prompt information, and modify a user right of the target reader on the target subdocument from the first user right to a second user right.

In a third aspect, an electronic device is provided according to embodiments of the present disclosure, including one or more processors, and a storage device storing one or more programs. The one or more programs, when executed by the one or more processors, cause the one or more processors to perform the method according to the first aspect.

In a fourth aspect, a computer-readable medium storing a computer program is provided according to embodiments of the present disclosure. The computer program, when executed by a processor, causes the processor to perform the right control method according to the first aspect.

With the right control method, right control apparatus and electronic device provided by the embodiments of the present disclosure, through the first prompt information, the user is prompted that the target subdocument needs to be shared so that the reader of the document can have the second user right on the target subdocument, that is, the readers who read the document can access the target subdocument. By actively prompting to authorize the reader of the document to have the second user right on the target subdocument, the number of times of sending an authorization request by a reader of the document who has the first user right on the target subdocument can be reduced. Also, The consumption of communication resources can be reduced, the speed of reading the document can be improved, and the efficiency of acquiring information by the user can be improved.

In the related art, after a first user who has the right to edit the online document adds a link to an explanatory document into the online document, an authorization request is sent to the account of the user who adds the explanatory document when a second user clicks the link to the explanatory document, to request to read the explanatory document. Only after the first user who adds the explanatory document agrees to the request, the second user can read this explanatory document.

As can be seen, in the present disclosure, through the first prompt information, the user is prompted that the target subdocument needs to be shared, so that the reader of the document can read the target subdocument without sending the authorization request. Therefore, the number of operations of sending an authorization request by a reader of the document can be reduced. Also, The consumption of communication resources can be reduced, the speed of reading the document can be improved, and the efficiency of acquiring information by the user can be improved.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

FIG. 1 is a flowchart of a right control method according to an embodiment of the present disclosure;

FIG. 6 is a flowchart of a right control method according to another embodiment of the present disclosure;

DETAILED DESCRIPTION

Figure 2A:
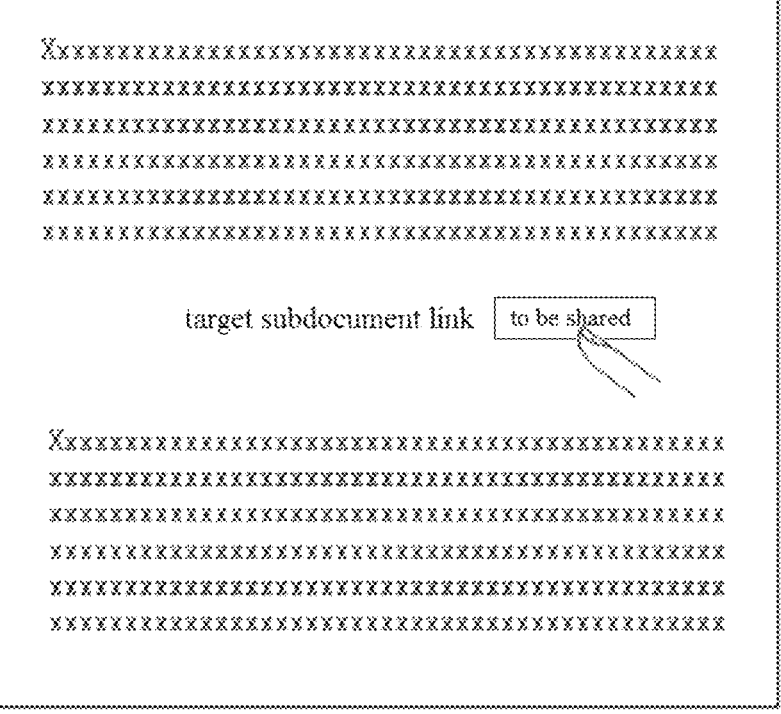
FIGS. 2A and 2B are schematic diagrams of a document displaying interface in a right control method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Further-more, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 is a flowchart of a right control method according to an embodiment of the present disclosure. The right control method may be applied in a terminal device. As shown in FIG. 1, the right control method includes the following steps 101 and 102.

In step 101, in response to determining that a document includes a target subdocument link, first prompt information associated with the target subdocument link is displayed.

Here, at least one reader is authorized to have a first user right on a target subdocument indicated by the target subdocument link.

A reader (a reader means a reader of a document) who is authorized to have the first user right on the target subdocument does not have one or more of an access right, an editing right, a sharing right and a copy right on the target subdocument. As an example, at least one reader can access the document, but can not access the target subdocument.

In this embodiment, the document may be understood as an online document. When creating the document, the creator of the document can authorize some users to have some rights (such as the access right, the editing right and the sharing right), and these users having some rights on the document may be understood as the readers of the document.

The target subdocument link may be understood as a link to another online document.

In step 102, a target reader is determined among the at least one reader based on an operation on the first prompt information, and a user right of the target reader on the target subdocument is modified from the first user right to a second user right.

Here, a reader who is authorized to have the second user right on the target subdocument may have one or more of an access right, an editing right, a sharing right and a copy right on the target subdocument. As an example, a reader who is authorized to have the second user right on the target subdocument can access not only the document but also the target subdocument.

Here, a target reader among the at least one reader is allowed to access both the document and the target subdocument, while a non-target reader among the at least one reader is allowed to access only the document and is not allowed to access the target subdocument.

In this embodiment, the above-mentioned readers all refer to user accounts that have access to the document. As an example, a user who is authorized to edit or forward a document may be referred to as a reader of the document.

According to the above steps 101 and 102, it can be seen that when at least one reader of the document has the first user right on the target subdocument, the first prompt information may be displayed to remind a user who is currently browsing the document, that at least one reader of the document does not yet have access to the target subdocument. At this time, the user may determine the target reader among the at least one reader of the document by triggering the first prompt information, and authorize the target reader to have the second right on the target subdocument, so that the target reader among the at least one reader has access to the target subdocument. In this way, the efficiency of sharing the target subdocument can be improved. That is, the reader of the document can be authorized to access the later added target subdocument.

In some embodiments, since the document is an online document, the user may be required to log into a corresponding login account in order to read the document. That is, when the creator of the document needs to authorize some users to have the second user right on the document, the creator may select the login accounts of these users and associate the online document with the login accounts. Here, the users corresponding to the selected login accounts can be understood as the readers of the document. In this way, some users (readers of the document) are authorized to access the document, while other users cannot access the document.

In some embodiments, some readers of a document may only have a reading right on the document, while some other readers of the document may have an editing right on the document.

As an example, when a user having an editing right on a document is reading the document, he may feel that a term in the document is not explained or not fully explained. In this time, the user having the editing right on the document may edit the document (by adding some contents, for example). If a large amount of contents are to be added, the user having the editing right on the document may create another online document to record the contents that need to be added into the document, and may add a link to the created online document into the document. Alternatively, the user having the editing right on the document may know some online documents that can be used to explain the document, so that the user may add links to these online documents into the document. The links added into the document can be understood as subdocument links.

Here, in creating a document, the creator of the document may authorize different accounts to have different rights, so that some readers of the document can only read the document, while some other users of the document can edit the document.

In some embodiments, each subdocument link may correspond to a subdocument, and the subdocument may also be an online document. Therefore, a second user right on the subdocument may be authorized to some users.

Here, the reader of the document may be different from the user who has the second user right on the subdocument. As an example, if the readers of the document do not include a user having the second user right on the subdocument, the first user right on the target subdocument may be authorized by default to the readers of the document. These readers of the document cannot access the target subdocument. For ease of understanding, an example is provided below.

The readers of the document include Xiao A, Xiao B, Xiao C, Xiao D, and Xiao E. The users who have the second user right on a target subdocument (any subdocument link in the document that needs to be shared can be understood as a target subdocument link, and the document indicated by the target subdocument link can be understood as a target subdocument) may only include: Xiao A, Xiao B, Xiao C, and Xiao Wang. In this case, the users who have the second user right on the target subdocument do not include all the readers of the document (because Xiao D and Xiao E do not have the second user right on the target subdocument, that is, the second user right on the target subdocument is not authorized to Xiao D and Xiao E). In this case, the first prompt information associated with the target subdocument link may be generated and displayed.

As an example, when the target subdocument is added into the document, the first user right on the target subdocument is authorized to all readers of the document by default. Since the target subdocument is also an online document, some users may already have the second user right on the target subdocument. Therefore, the users having the second user right on the target subdocument may be compared with the readers of the document (here, the user accounts may be used for the comparison), and a matched user is a user having the second user right. That is, if the users who have the second user right on the target subdocument do not include all the readers of the document, the non-included reader (which can be understood as the at least one reader) can be understood as a user only having the first user right on the target subdocument. At this time, the first prompt information may be displayed to prompt that the target subdocument needs to be shared.

In some embodiments, the display position of the first prompt information may correspond to the target subdocument link. For example, the first prompt information may be displayed on the right of the subdocument link. Apparently, the specific display position of the first prompt information is not limited here, which may be configured according to actual situations. For example, the first prompt information may be displayed on the left of, above, or below the link of the subdocument.

In some embodiments, the first prompt information may be used to prompt that some readers of the document do not have the second user right on the subdocument. In other words, at least one reader of the document does not have the second user right on the target subdocument.

Figure 2B:
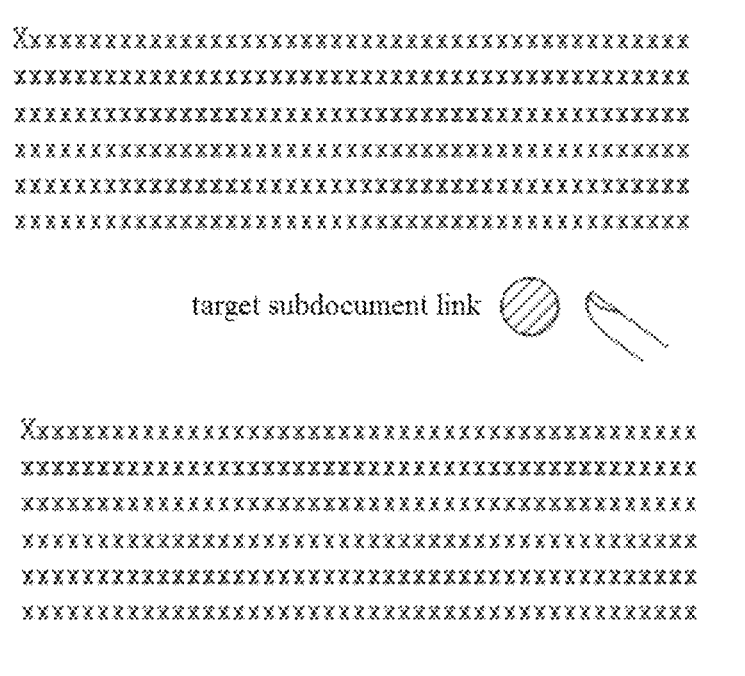

In some embodiments, the first prompt information may be text information or marker information. For example, when the first prompt information is text information, the content of the text information may be "to be shared", as shown in FIG. 2A. When the first prompt information is marker information, the marker information may be a circular marker, as shown in FIG. 2B. It should be noted that, the above is only an example, and in practices, the content of the text information and the shape of the marker information can be configured according to actual requirements, which are not limited here.

In practices, the first prompt information may also be in other forms, for example, the reader identifier of the reader who does not have the second user right on the target subdocument may be displayed.

It can be seen that the first prompt information is only used to remind the user that the target subdocument is not shared, and the specific form of the first prompt information can be determined according to actual requirements, which is not limited here. .

In some embodiments, when the first prompt information associated with the the target subdocument link is displayed, the number of users who is required to be authorized to have the second user right on the target subdocument may be indicated.

Figure 3:
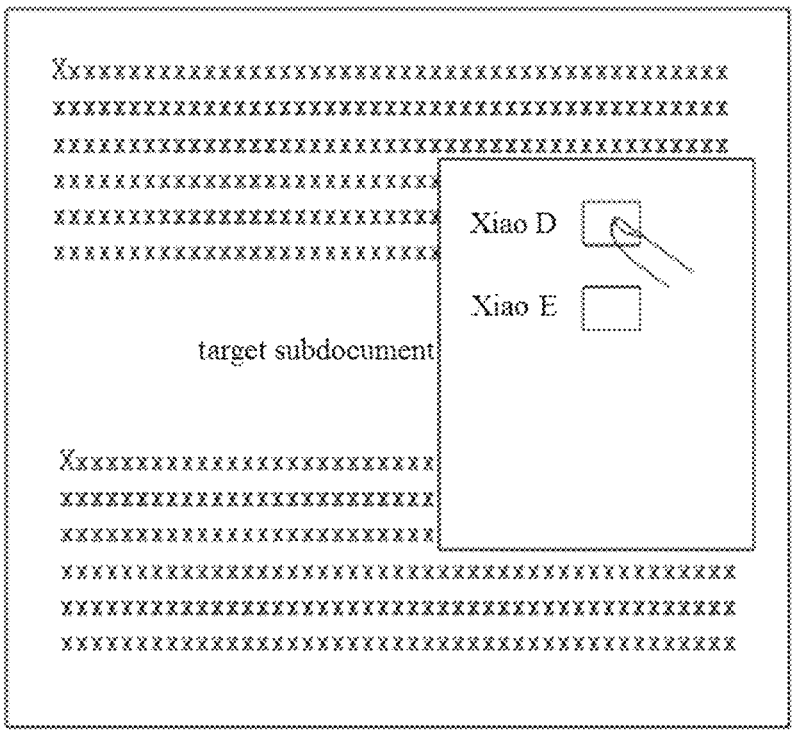
FIG. 3 is a schematic diagram of a document displaying interface in a right control method according to another embodiment of the present disclosure.

In some embodiments, when the first prompt information is marker information, the user may click on the marker information, so that the displaying interface displays the reader identifiers of the readers who have the first user right on the target subdocument. As shown in FIG. 3, the reader identifiers of Xiao D and the Xiao E may be displayed, and the user may select the displayed reader identifiers (for example, the user may click the check boxes on the right of Xiao D and the Xiao E, to select Xiao D and the Xiao E), so that the selected reader identifiers are linked with the target subdocument link. In other words, the readers corresponding to the selected reader identifiers are authorized to have the second user right. For example, if Xiao D is selected, the user right of Xiao D on the target subdocument is modified from the first user right to the second user right. Thus, the number of users who have the second user right on the target subdocument is increased.

In the related art, after a first user who has the second user right on the online document adds a link to an explanatory document into the online document, an authorization request is sent to the account of the user who adds the explanatory document when a second user clicks the link to the explanatory document, to request to authorize the second user to have the second right. Only after the first user who adds the explanatory document agrees to the request, the second user can be authorized to have the second right on this explanatory document.

It can be seen that in this embodiment, through the first prompt information, the user is prompted that the target subdocument needs to be shared, so that the reader of the document can have the second user right on the target subdocument, that is, the readers who read the document can access the target subdocument. By actively prompting to authorize the reader of the document to have the second user right on the target subdocument, the number of times of sending an authorization request by a reader of the document who has the first user right on the target subdocument can be reduced. Also, The consumption of communication resources can be reduced, the speed of reading the document can be improved, and the efficiency of acquiring information by the user can be improved.

In some embodiments, in response to a detected subdocument link adding operation on the document, it is determined whether a subdocument link added by the subdocument link adding operation is the target subdocument link.

In some embodiments, some readers of a document may edit the document by performing a subdocument link adding operation to add a subdocument link into the document.

Here, the subdocument link adding operation may be a copy-paste operation. For example, a reader of a document may copy a subdocument link first, and then paste it into the document.

In some embodiments, when the subdocument link added by the subdocument link adding operation is a target subdocument link, the first prompt information may be displayed to indicate that the added subdocument is a subdocument to be shared.

In some embodiments, the first prompt information may include a reader identifier of a reader who has the first user right on the target subdocument. In this case, in response to determining that the added subdocument link is a target subdocument link, the reader identifier of the reader who has the first user right on the target subdocument may be displayed.

Here, by directly displaying the reader identifier of the reader who has the first user right on the target subdocument, the user can be more clearly reminded to share the target subdocument, thereby further improving the efficiency of sharing the target subdocument.

For example, the readers of the document include: Xiao A, Xiao B, Xiao C, Xiao D and Xiao E, and the users who have the second user right on the target subdocument include: Xiao A, Xiao B, Xiao C and Xiao Wang. In this case, the users having the second user right on the target subdocument do not include all the users having the second user right on the document (Xiao D and Xiao E are not included). In other words, it can be understood that Xiao D and Xiao E have the first user right on the target subdocument. Therefore, the account identifiers of Xiao D and Xiao E may be directly displayed, as shown in FIG. 3.

It can be seen that after the reader having the right to edit the document adds the target subdocument link into the document, the reader identifiers of the readers having the first user right on the target subdocument can be displayed immediately, so that the reader having the right to edit the document can authorize the readers having the first user right on the target subdocument to have the second right on the target subdocument (which can be understood as modifying the user right of the readers from the first user right to the second user right). In other words, after the subdocument link is added into the document, the reader having the right to edit the document can immediately increase the number of readers having the second user right on the target subdocument.

That is, after adding the target subdocument link into the document, the user can be immediately prompted to share the target subdocument, so that some users who have only the first user right on the target subdocument do not need to send authorization requests to the reader having the right to edit the document, thereby further improving the efficiency of acquiring information by the users.

In some embodiments, the first prompt information includes a triggering control, and in response to a detected triggering operation on the triggering control, a reader identifier of a reader having the first user right on the target subdocument may be displayed.

In some embodiments, the first prompt information may be as shown in FIG. 2A or FIG. 2B. The triggering control may be set at the position of the first prompt information. That is, when the reader having the right to edit the document performs the triggering operation at the position of the first prompt information, the displaying interface may display a reader identifier of a reader having the first user right on the target subdocument, as shown in FIG. 3.

Figure 4:
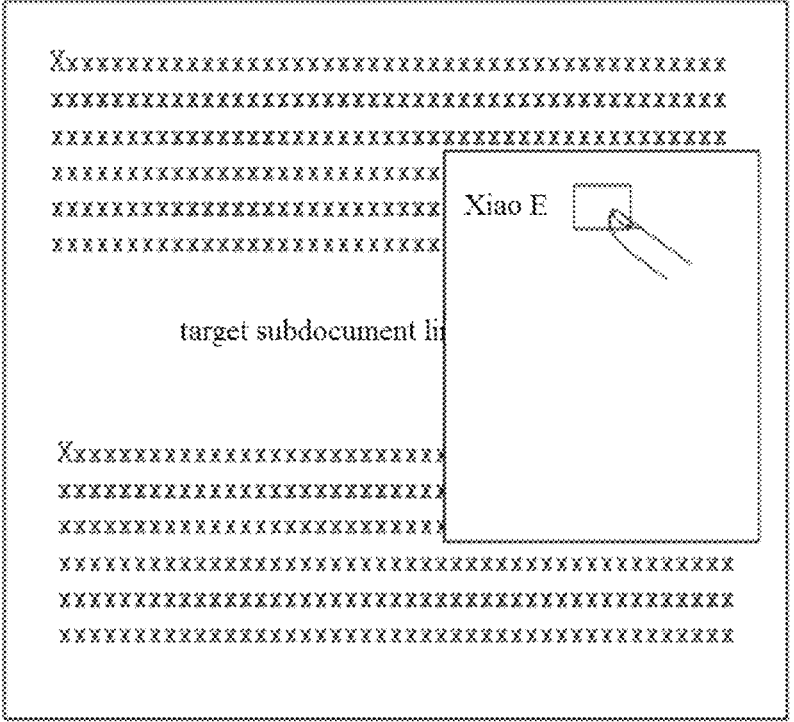
FIG. 4 is a schematic diagram of a document displaying interface in a right control method according to another embodiment of the present disclosure.

In some embodiments, there may be multiple readers having the right to edit the document. For ease of understanding, in the following example, a reader having the right to edit the document is referred to as an editor. After an editor of the document (editor A) adds a target subdocument link into the document, an interface as shown in FIG. 3 may be displayed. That is, the interface for authorizing the readers indicated by the two reader identifiers to have the second user right on the target subdocument may be displayed. If editor A only authorizes Xiao D to have the second user right on the target subdocument while does not authorize Xiao E to have the second user right on the target subdocument, when another editor of the document (editor B) reads the document to the link of the target subdocument, the interface as shown in FIG. 2A or FIG. 2B may be displayed. At this time, editor B may perform a triggering operation (such as click, long press, or the like) on the first prompt information as shown in FIG. 2A or FIG. 2B, so that the interface as shown in FIG. 4 is displayed, in which the reader identifier of the reader who has the first user right on the target subdocument (at this time, only Xiao E) is displayed.

Apparently, in some embodiments, after editor A adds the target subdocument link, editor A may authorize all readers to have the second user right on the target subdocument. However, the creator of the document may add some other readers later. For example, readers Xiao Hong and Xiao Li are added. At this time, Xiao Hong and Xiao Li may not have the second user right on the target subdocument. In order to authorize Xiao Hong and Xiao Li to have the second user right on the target subdocument, the first prompt information is displayed at the target subdocument link when editor B reads to the target subdocument link in the document.

In some embodiments, by providing the triggering control, the editor of the document, when reading the document, can perform a triggering operation on the triggering control, so as to display the reader identifier of the reader who has the first user right on the target subdocument. Through the selection operation selecting the reader identifier, the target reader is selected, and the user right of the target reader is modified from the first user right to the second user right, so that the reader of the document can quickly obtain the second user right on the target subdocument, thereby improving the efficiency of sharing the target subdocument.

In some embodiments, step 102 of determining a target reader among the at least one reader based on the operation on the first prompt information may specifically include: determining, in response to a detected selection operation selecting a displayed reader identifier, a reader indicated by the selected reader identifier as the target reader.

In this embodiment, the reader indicated by the displayed reader identifier is a reader who has the first user right on the target subdocument.

In some embodiments, the editor of the document, when reading the document, may not know whether all the displayed reader identifiers should to be authorized to have the second user right on the target subdocument. Therefore, the editor of the document may select only some the displayed reader identifiers to authorize them to have the second user right, and the selected reader identifiers can be understood as the target reader identifiers. The readers indicated by the target reader identifiers can be understood as the target readers. In this way, the target readers can be authorized to have the second user right on the target subdocument.

In this way, the user can authorize multiple readers to have the second user right on the target subdocument at one time, thereby improving the efficiency of authorizing readers of the document to have the second user right on the target subdocument.

In some embodiments, the first prompt information includes a select-all control. In this case, in response to a detected triggering operation on the select-all control, all readers indicated by the displayed reader identifiers are determined as target readers.

In these embodiments, by providing the select-all control, the efficiency of authorizing readers of the document to have the second user right on the target subdocument can be further improved. That is, the user can authorize the readers of the document to have the second user right on the target subdocument at one time.

In some embodiments, the second user right includes at least one sub-right. As an example, the second user right may include a right to read the target subdocument, a right to edit the target subdocument, and the like. The right to read the target subdocument may be understood as a sub-right, and the right to edit the target subdocument may be understood as another sub-right.

In this embodiment, the step 102 of determining a target reader among the at least one reader based on an operation on the first prompt information and modifying a user right of the target reader on the target subdocument from the first user right to a second user right may include: displaying a sub-right identifier of the sub-right; determining, in response to a detected selection operation selecting the sub-right identifier, the selected sub-right identifier as a target sub-right identifier, and determining a reader identifier associated with the target sub-right identifier; and determining a reader indicated by the reader identifier associated with the target sub-right identifier as the target reader, and modifying the user right of the target reader on the target subdocument from the first user right to a target sub-right.

Here, the sub-right identifier is associated with a reader identifier of a reader. That is, each reader identifier corresponds to a sub-right identifier.

Figure 5A:
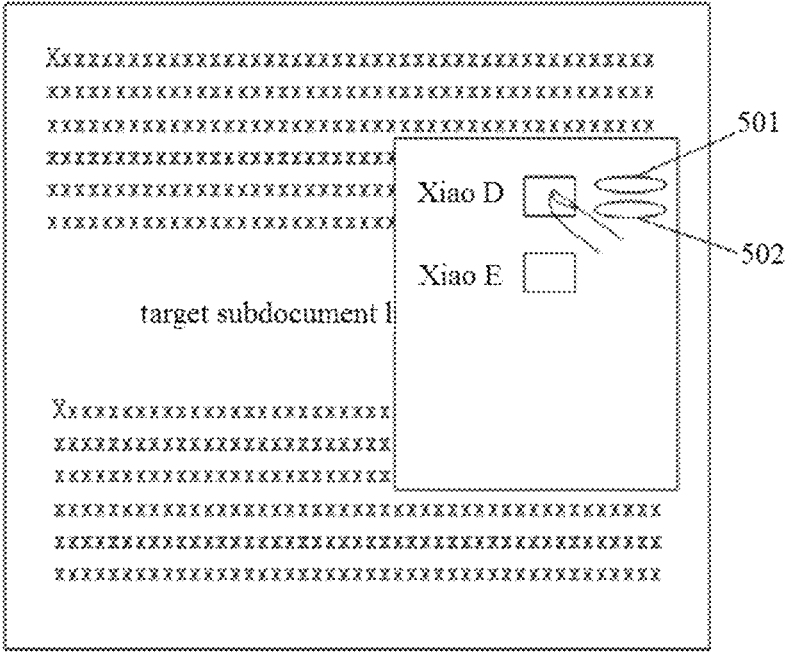
FIGS. 5A and 5B are schematic diagrams of a document displaying interface in a right control method according to another embodiment of the present disclosure.

In some embodiments, the sub-right identifier may be displayed at a position corresponding to a position for displaying the reader identifier, and the user can perform a selection operation selecting the sub-right identifier to authorize a reader to have the second sub-right on the target subdocument. As shown in FIG. 5A, sub-right identifiers may be displayed (the sub-right identifiers include: editing right identifier 501 and a reading right identifier 502). If the editor of the document wants to authorize a reader to have the editing right on the target subdocument, the editor may select the editing right identifier 501.

It can be seen that the editor of the document can authorize one or more readers to have different sub-rights to the target subdocument. For example, the editor may authorize one reader to have the right to read the target subdocument, and authorize another reader to have the right to edit the target subdocument. In this way, the editor of the document may set different sub-rights for different readers in advance, so that the readers of the document will not send authorization requests to the editor of the document when reading the document.

In this embodiment, not only the efficiency of sharing the target subdocument is improved, but also different readers can be authorized to have different sub-rights, thereby avoiding that some readers send right modifying requests (for example, some users may need to have the right to edit the target subdocument, but is only authorized to have the right to edit the target subdocument), and thus further improving the efficiency of acquiring information by users.

Figure 5B:
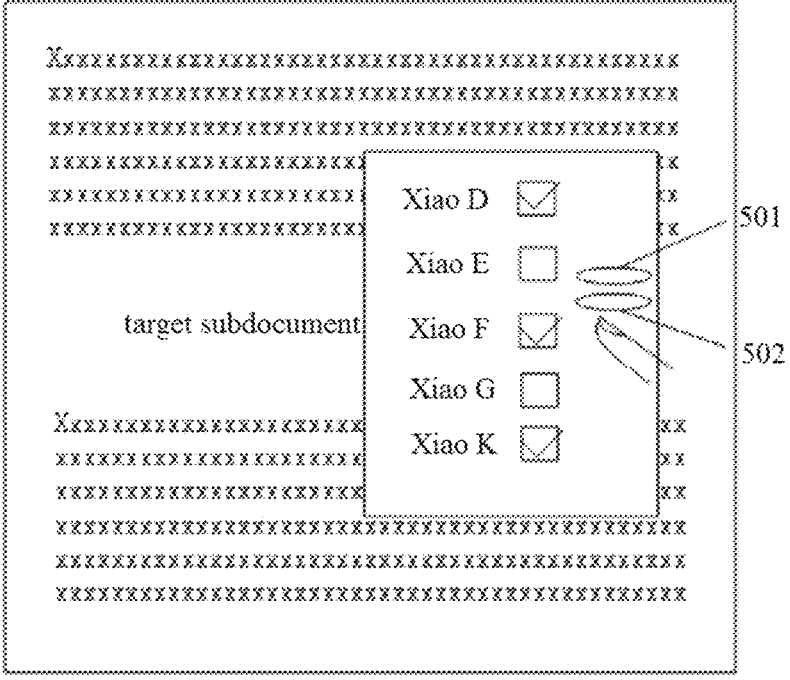

In some embodiments, the editor of the document may also first determine some of the readers as target readers (readers to be authorized to have the same sub-right on the target subdocument). If these readers are to be authorized to have the same sub-right on the target subdocument, the editor can authorize these readers to have the same sub right on the target subdocument at one time. As shown in FIG. 5B, Xiao D, Xiao F and Xiao K may be target readers. That is, the editor of the document may first select Xiao D, Xiao F and Xiao K, and then the interface may display the editing right identifier 501 and the reading right identifier 502. If the editor of the document selects the reading right identifier 502, Xiao D, Xiao F and Xiao K are authorized to have the reading right on the target subdocument. It should be noted that, both the editing right identifier 501 and the reading right identifier 502 are the sub-right identifier.

It can be seen that, the users indicated by the reader identifiers can be authorized to have the target sub-right on the target subdocument by simply selecting the sub-right identifier. Compared with the conventional technology that the readers need to send requests to have the sub-right, the technical solution provided in the present disclosure not only simplifies the method of authorizing readers to have the sub-rights, but also allows authorizing different readers to have different sub-rights (the reading right or the editing right) and authorizing different readers to have the same sub-right, thereby improving the efficiency of authorizing the sub-rights.

In some embodiments, as shown in FIG. 6, the document displaying interface may include a viewing control, and the right control method may include steps 601 to 603. For details of steps 601 and 602, one may refer to the description of steps 101 and 102, which will not be repeated here.

In step 603, in response to a detected triggering operation on the viewing control, a subdocument link list is displayed.

Here, the subdocument link list is generated from subdocument links in the document.

In some embodiments, the subdocument link list may include all subdocument links in the document. That is, all subdocument links added into the document may be displayed in the subdocument link list. In other words, the editor of the document can view all subdocument links added into the document by triggering the viewing control.

In some embodiments, when it is determined that the target subdocument link is included in the subdocument link list, second prompt information associated with the target subdocument link is displayed.

Figure 7:
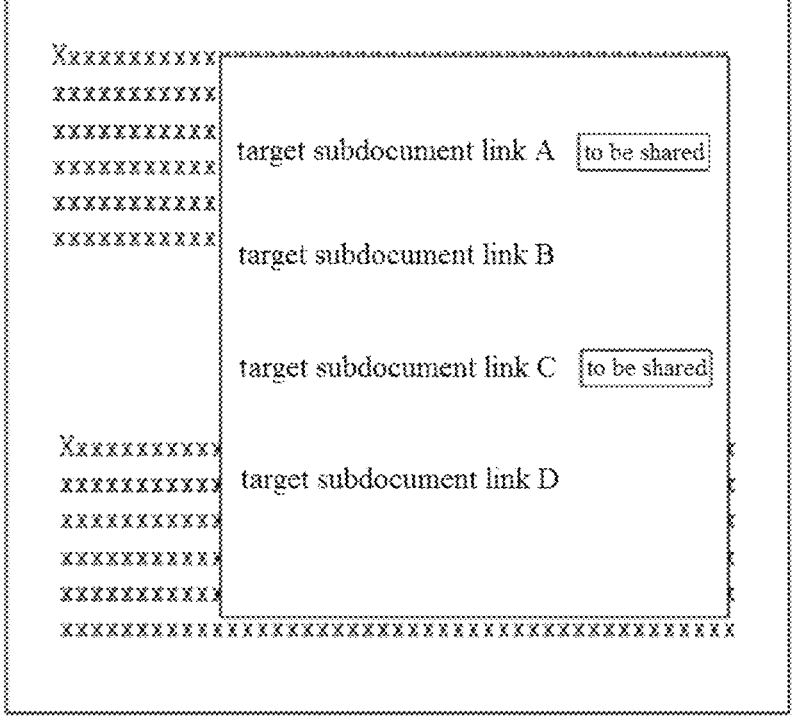
FIG. 7 is a schematic diagram of a document displaying interface in a right control method according to another embodiment of the present disclosure.

In some embodiments, multiple subdocument links may be added into the document, and subdocuments indicated by some subdocument links may already be shared, while subdocuments indicated by the other subdocument links may still need to be shared (the target subdocument indicated by the target subdocument link needs to be shared). In order to assistant the user to view the sharing status of each subdocument link, the viewing control may be displayed on the displaying interface, and the subdocument link list may be displayed when a triggering operation on the viewing control is detected, as shown in FIG. 7. The subdocument link list includes all subdocument links added into the document. That is, the second prompt information may be displayed for the target subdocument links, and may be used to indicate the subdocument link that has not been shared (as shown in FIG. 7).

Through the second prompt information, the editor of the document can clearly know the sharing status of each subdocument link, and can be reminded to share the subdocument that has not been shared, thereby further improving the efficiency of sharing the target subdocument.

In some embodiments, the currently logged-in account is an account that has the right to share the document.

In some embodiments, the reader of the document can only read the document, and the editor of the document can edit and read the document. The editing the document includes adding a subdocument link into the document, and authorizing second user right on the subdocument indicated by the document link. Therefore, in some embodiments, only if the currently logged-in account is an account having the right to share the document (which can be understood as an editor of the document), the displaying interface displays the first prompt information and the second prompt information.

Figure 8:
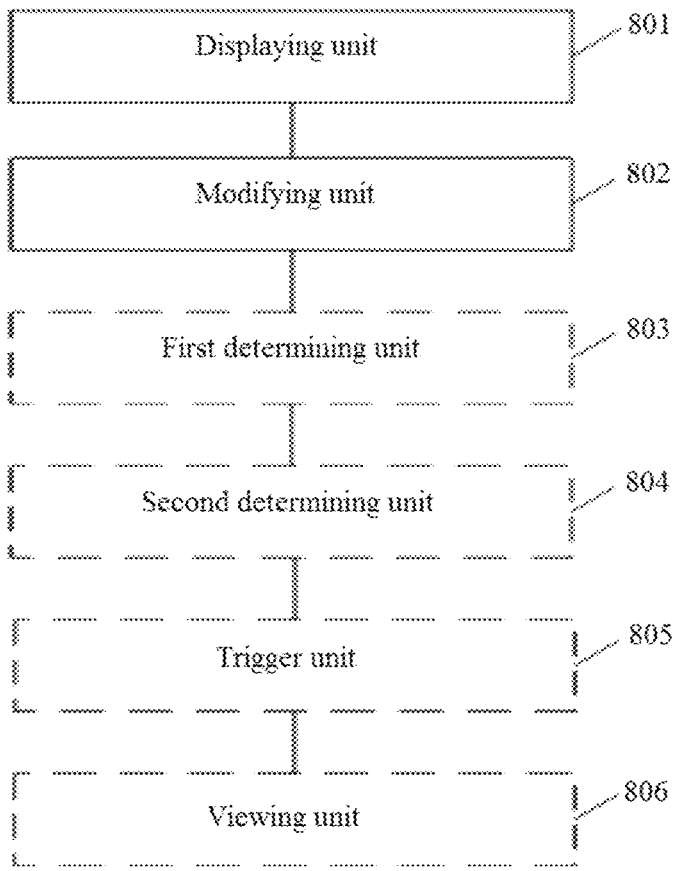
FIG. 8 is a schematic structural diagram of a right control apparatus according to an embodiment of the present disclosure.

Referring to FIG. 8, as an implementation of the above methods, a right control apparatus is provided according to an embodiment of the present disclosure. The apparatus embodiment corresponds to the authority control method embodiment as shown in FIG. 1. The apparatus may be applied to various electronic devices.

As shown in FIG. 8, the right control apparatus according to this embodiment includes: a displaying unit 801, configured to display, in response to determining that a document includes a target subdocument link, first prompt information associated with the target subdocument link, where at least one reader is authorized to have a first user right on a target subdocument indicated by the target subdocument link; and a modifying unit 802, configured to determine a target reader among the at least one reader based on an operation on the first prompt information, and modify a user right of the target reader on the target subdocument from the first user right to a second user right.

In some embodiments, the right control apparatus further includes a first determining unit 803, configured to determine, in response to a detected subdocument link adding operation on the document, whether a subdocument link added by the subdocument link adding operation is the target subdocument link.

In some embodiments, the first prompt information includes a reader identifier of a reader authorized to have the first user right on the target subdocument, and the right control apparatus further includes a second determining unit 804, configured to display, in response to determining that the added subdocument link is the target subdocument link, the reader identifier of the reader authorized to have the first user right on the target subdocument.

In some embodiments, the first prompt information includes a triggering control; and the right control apparatus further includes a trigger unit 805 configured to display, in response to a detected triggering operation on the triggering control, a reader identifier of a reader authorized to have the first user right on the target subdocument.

In some embodiments, the modifying unit 802 is further configured to determine, in response to a detected selection operation selecting a displayed reader identifier, a reader indicated by the selected reader identifier as the target reader.

In some embodiments, the first prompt information includes a select-all control; and the modifying unit 802 is further configured to determine, in response to a detected triggering operation on the select-all control, each of readers indicated by displayed reader identifiers as the target reader.

In some embodiments, the modifying unit 802 is further configured to: display a sub-right identifier of the sub-right, where the sub-right identifier is associated with a reader identifier of a reader; determine, in response to a detected selection operation selecting the sub-right identifier, the selected sub-right identifier as a target sub-right identifier, and determine a reader identifier associated with the target sub-right identifier; and determine a reader indicated by the reader identifier associated with the target sub-right identifier as the target reader, and modifying the user right of the target reader on the target subdocument from the first use right to a target sub-right.

In some embodiments, the document displaying interface includes a viewing control; and the right control apparatus further includes a viewing unit 806, configured to display, in response to a detected triggering operation on the viewing control, a subdocument link list, where the subdocument link list is generated from subdocument links in the document.

In some embodiments, the viewing unit 806 is further configured to display, in response to determining that the target subdocument link is comprised in the subdocument link list, second prompt information associated with the target subdocument link.

Figure 9:
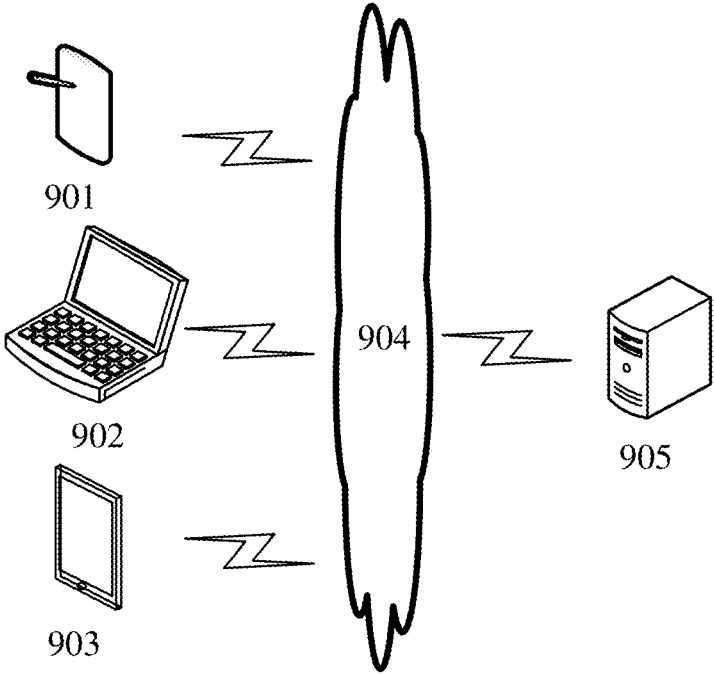
FIG. 9 is a schematic architectural diagram of a system for applying a right control method according to an embodiment of the present disclosure.

FIG. 9 is a schematic architectural diagram of a system for applying a right control method according to an embodiment of the present disclosure.

As shown in FIG. 9, the system architecture may include terminal devices 901, 902 and 903, a network 904, and a server 905. The network 904 may be used to provide communication links between the terminal devices 901, 902 and 903 and the server 905. Network 904 may include various types of connections, such as wired or wireless communication links, fiber optic cables, or the like.

The terminal devices 901, 902 and 903 can interact with the server 905 through the network 904 to receive or send messages. Various client applications may be installed on the terminal devices 901, 902 and 903, such as web browser applications, search applications, and news applications. The client applications on the terminal devices 901, 902, and 903 can receive user instructions, and perform functions according to the user instructions. For example, adding some information to some other information according to a user instruction.

The terminal devices 901, 902 and 903 may be embodied in hardware or software. When the terminal devices 901, 902 and 903 are embodied in hardware, they can be various electronic devices that have a display screen and support web browsing, including but not limited to smart phones, tablet computers, e-book readers, and MP3 (Moving Picture Experts Group Audio Layer III) players, MP4 (Moving Picture Experts Group Audio Layer IV) players, laptops and desktops. When the terminal devices 901, 902 and 903 are embodied in software, they can be installed on the electronic devices listed above. It may be implemented as multiple software or software modules (e.g., software or software modules for providing distributed services), or may be implemented as a single software or software module, which is not limited here.

The server 905 may be a server that provides various services, such as receiving information acquisition requests sent by the terminal devices 901, 902 and 903, acquiring display information corresponding to the information acquisition requests in various ways, and sending data of the display information to the terminal devices 901 , 902 and 903.

It should be noted that the information processing method provided by the embodiments of the present disclosure may be executed by a terminal device, and correspondingly, the right control apparatus may be arranged in the terminal devices 901, 902, and 903. Alternatively, the information processing method provided by the embodiments of the present disclosure may be executed by the server 905, and accordingly, the information processing apparatus may be arranged in the server 905.

It should be understood that the numbers of the terminal devices, the networks and the servers as shown in FIG. 9 are only illustrative. Any numbers of the terminal devices, the networks and the servers may be implemented according to requirements.

Figure 10:
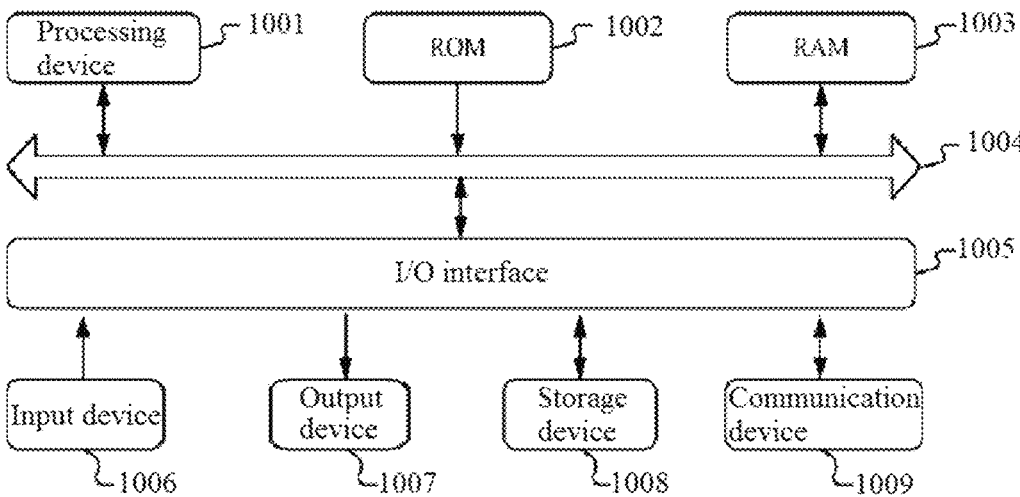
FIG. 10 is a schematic structural diagram of an electronic device according to an embodiment of the present disclosure.

FIG. 10 is a schematic structural diagram of an electronic device (such as the terminal device or the server as shown in FIG. 9) suitable for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in FIG. 10 is only an example, and should not impose any limitation on the functions and applications of the embodiments of the present disclosure.

As shown in FIG. 10, the electronic device may include a processing device (such as a central processing unit, a graphics processor) 1001 that may execute various appropriate actions and processes according to a program stored in a read only memory (ROM) 1002 or loaded into random access memory (RAM) 1003 from a storage device 1008. In the RAM 1003, various programs and data necessary for the operation of the electronic device are also stored. The processing device 1001, the ROM 1002, and the RAM 1003 are connected to each other through a bus 1004. An input/output (I/O) interface 1005 is also connected to the bus 1004.

Normally, the following devices may be connected to the I/O interface 1005: an input device 1006 such as a touch screen, a touchpad, a keyboard, a mouse, a camera, a microphone, an accelerometer, a gyroscope and the like; an output device 1007, such as a liquid crystal display (LCD), a speaker, a vibrator and the like; a storage device 1008, such as a magnetic tape, a hard disk and the like; and a communication device 1009. The communication device 1009 may enable the electronic device to communicate in a wireless or wired manner with other devices to exchange data. Although FIG. 10 shows the electronic device having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 1009, or from the storage device 1008, or from the ROM 1002. When the computer program is executed by the processing device 1001, the functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The computer-readable medium may be included in the multimedia conference device, or may exist alone without being assembled into the multimedia conference device.

The computer-readable medium carries one or more programs. The one or more programs, when being executed by the multimedia conference device, cause the multimedia conference device to display, in response to determining that a document comprises a target subdocument link, first prompt information associated with the target subdocument link, wherein at least one reader is authorized to have a first user right on a target subdocument indicated by the target subdocument link; and determine a target reader among the at least one reader based on an operation on the first prompt information, and modify a user right of the target reader on the target subdocument from the first user right to a second user right.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (eg, using Internet connection provided by an Internet service provider).

The flowcharts and block diagrams in the figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances. For example, the displaying unit 801 may be described as a unit for displaying first prompt information associated with the target subdocument link.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

The above merely describes preferred embodiments of the present disclosure and illustrates the technical principles. Those skilled in the art should understand that the scope of the disclosure is not limited to the technical solutions formed by the specific combination of the technical features, and should also cover, without departing from the above disclosed concept, the technical solutions formed by any combination of the technical features or other equivalent features. For example, a technical solution may be formed by replacing a feature with another feature having similar function disclosed in the present disclosure (but not limited to).

Additionally, although operations are illustrated in a particular order, this should not be construed as requiring the operations to be performed in the particular shown order. Under certain circumstances, multitasking and parallel processing may be advantageous. Similarly, although the above discussion contains several specific details, these should not be construed as limitations on the scope of the present disclosure. Certain features that are described in the context of separate embodiments can also be combined into a same embodiment. Conversely, various features that are described in the context of a same embodiment can also be implemented in multiple embodiments separately or in any suitable subcombination.

Although the subject matter has been described in language specific to structural features and/or logical method steps, it is to be understood that the subject matter defined in the appended claims is not necessarily limited to the specific features or steps described above. Rather, the specific features and steps described above are merely examples of implementing the claims.

What is claimed is:

1. A right control method, comprising:
    displaying, in response to determining that a document comprises a target subdocument link, first prompt information associated with the target subdocument link, wherein at least one reader is authorized to have a first user right on a target subdocument indicated by the target subdocument link;

determining a target reader among the at least one reader based on an operation on the first prompt information, and modifying a user right of the target reader on the target subdocument from the first user right to a second user right, wherein, the reader who is authorized to have the first user right on the target subdocument can access the document, but cannot access the target subdocument, and the reader who is authorized to have the second user right on the target subdocument can access the target subdocument, wherein the displaying first prompt information associated with the target subdocument link comprises:

if the readers of the document include the users who do not have the second user right on the target subdocument, displaying first prompt information associated with the target subdocument link;

displaying, in response to determining that the target subdocument link is comprised in the subdocument link list, second prompt information associated with the target subdocument link in the corresponding area of the subdocument link list, wherein the subdocument link list is generated from subdocument links in the document, the second prompt information indicates the subdocument link that has not been shared, wherein shared refers to authorizing the second user right on the subdocument indicated by document link for a reader of the document;

the second user right includes at least one sub-right; and wherein the determining a target reader among the at least one reader based on an operation on the first prompt information, and modifying a user right of the target reader on the target subdocument from the first user right to a second user right comprises:

displaying a sub-right identifier of the sub-right, wherein the sub-right identifier is associated with a reader identifier of a reader;

determining, in response to a detected selection operation selecting the sub-right identifier, the selected sub-right identifier as a target sub-right identifier, and determining a reader identifier associated with the target sub-right identifier; and determining a reader indicated by the reader identifier associated with the target sub-right identifier as the target reader, and authorizing the target reader to have a target sub-right by modifying the user right of the target reader on the target subdocument from the first user right to the target sub-right.

2. The method of claim 1, further comprising:

determining, in response to a detected subdocument link adding operation on the document, whether a subdocument link added by the subdocument link adding operation is the target subdocument link.

3. The method according to claim 2, wherein the first prompt information comprises a reader identifier of a reader authorized to have the first user right on the target subdocument; and the method further comprises:

displaying, in response to determining that the added subdocument link is the target subdocument link, the reader identifier of the reader authorized to have the first user right on the target subdocument.

4. The method according to claim 1, wherein the first prompt information comprises a triggering control; and the method further comprises:

displaying, in response to a detected triggering operation on the triggering control, a reader identifier of a reader authorized to have the first user right on the target subdocument.

5. The method according to claim 3, wherein the determining a target reader among the at least one reader based on an operation on the first prompt information comprises:

determining, in response to a detected selection operation selecting a displayed reader identifier, a reader indicated by the selected reader identifier as the target reader.

6. The method according to claim 4, wherein the determining a target reader among the at least one reader based on an operation on the first prompt information comprises:

determining, in response to a detected selection operation selecting a displayed reader identifier, a reader indicated by the selected reader identifier as the target reader.

7. The method according to claim 1, wherein the first prompt information comprises a select-all control; and the method further comprises:

determining, in response to a detected triggering operation on the select-all control, each of readers indicated by displayed reader identifiers as the target reader.

8. The method of claim 1, wherein the document displaying interface includes a viewing control; and the method further comprises:

displaying, in response to a detected triggering operation on the viewing control, a subdocument link list, wherein the subdocument link list is generated from subdocument links in the document.

9. The method according to claim 1, wherein the first prompt information comprises at least one of text information and marker information.

10. A right control apparatus, comprising:

at least one processor; and at least one memory communicatively coupled to the at least one processor and storing instructions that upon execution by the at least one processor cause the apparatus to:

display, in response to determining that a document comprises a target subdocument link, first prompt information associated with the target subdocument link, wherein at least one reader is authorized to have a first user right on a target subdocument indicated by the target subdocument link;

determine a target reader among the at least one reader based on an operation on the first prompt information, and modify a user right of the target reader on the target subdocument from the first user right to a second user right, wherein, the reader who is authorized to have the first user right on the target subdocument can access the document, but cannot access the target subdocument;

the reader who is authorized to have the second user right on the target subdocument can access the target subdocument, wherein the display first prompt information associated with the target subdocument link comprises:

if the readers of the document include the users who do not have the second user right on the target subdocument, display first prompt information associated with the target subdocument link;

display, in response to determining that the target subdocument link is comprised in the subdocument link list, second prompt information associated with the target subdocument link in the corresponding area of the subdocument link list, wherein the subdocument link list is generated from subdocument links in the document, the second prompt information indicates the subdocument link that has not been shared, wherein shared refers to authorizing the second user right on the subdocument indicated by document link for a reader of the document;

the second user right includes at least one sub-right; and wherein the at least one memory further storing instructions that upon execution by the at least one processor cause the apparatus to:

display a sub-right identifier of the sub-right, wherein the sub-right identifier is associated with a reader identifier of a reader;

determine, in response to a detected selection operation selecting the sub-right identifier, the selected sub-right identifier as a target sub-right identifier, and determine a reader identifier associated with the target sub-right identifier; and determine a reader indicated by the reader identifier associated with the target sub-right identifier as the target reader, and authorize the target reader to have a target sub-right by modifying the user right of the target reader on the target subdocument from the first user right to the target sub-right.

11. The apparatus of claim 10, the at least one memory further storing instructions that upon execution by the at least one processor cause the apparatus to:

determine, in response to a detected subdocument link adding operation on the document, whether a subdocument link added by the subdocument link adding operation is the target subdocument link.

12. The apparatus of claim 11, wherein the first prompt information comprises a reader identifier of a reader authorized to have the first user right on the target subdocument; and the at least one memory further storing instructions that upon execution by the at least one processor cause the apparatus to:

display, in response to determining that the added subdocument link is the target subdocument link, the reader identifier of the reader authorized to have the first user right on the target subdocument.

13. The apparatus of claim 10, wherein the first prompt information comprises a triggering control; and the at least one memory further storing instructions that upon execution by the at least one processor cause the apparatus to:

display, in response to a detected triggering operation on the triggering control, a reader identifier of a reader authorized to have the first user right on the target subdocument.

14. The apparatus of claim 12, the at least one memory further storing instructions that upon execution by the at least one processor cause the apparatus to:

determine, in response to a detected selection operation selecting a displayed reader identifier, a reader indicated by the selected reader identifier as the target reader.

15. The apparatus of claim 10, wherein the first prompt information comprises a select-all control; and the at least one memory further storing instructions that upon execution by the at least one processor cause the apparatus to:

determine, in response to a detected triggering operation on the select-all control, each of readers indicated by displayed reader identifiers as the target reader.

16. A computer-readable non-transitory medium storing a computer program, wherein the computer program, when executed by a computer, cause the computer to display, in response to determining that a document comprises a target subdocument link, first prompt information associated with the target subdocument link, wherein at least one reader is authorized to have a first user right on a target subdocument indicated by the target subdocument link;

determine a target reader among the at least one reader based on an operation on the first prompt information, and modify a user right of the target reader on the target subdocument from the first user right to a second user right, wherein, the reader who is authorized to have the first user right on the target subdocument can access the document, but cannot access the target subdocument;

the reader who is authorized to have the second user right on the target subdocument can access the target subdocument, wherein the display first prompt information associated with the target subdocument link comprises:

if the readers of the document include the users who do not have the second user right on the target subdocument, display first prompt information associated with the target subdocument link;

display, in response to determining that the target subdocument link is comprised in the subdocument link list, second prompt information associated with the target subdocument link in the corresponding area of the subdocument link list, wherein the subdocument link list is generated from subdocument links in the document, the second prompt information indicates the subdocument link that has not been shared, wherein shared refers to authorizing the second user right on the subdocument indicated by document link for a reader of the document;

the second user right includes at least one sub-right; and wherein the determine a target reader among the at least one reader based on an operation on the first prompt information, and modify a user right of the target reader on the target subdocument from the first user right to a second user right comprises:

display a sub-right identifier of the sub-right, wherein the sub-right identifier is associated with a reader identifier of a reader;

determine, in response to a detected selection operation selecting the sub-right identifier, the selected sub-right identifier as a target sub-right identifier, and determine a reader identifier associated with the target sub-right identifier; and determine a reader indicated by the reader identifier associated with the target sub-right identifier as the target reader, and authorize the target reader to have a target sub-right by modifying the user right of the target reader on the target subdocument from the first user right to the target sub-right.

* * * * *